Dec. 21, 1926.  
J. SCHURCH  
ROTARY VALVE  
Filed July 7, 1925  
1,611,683  
2 Sheets-Sheet 1
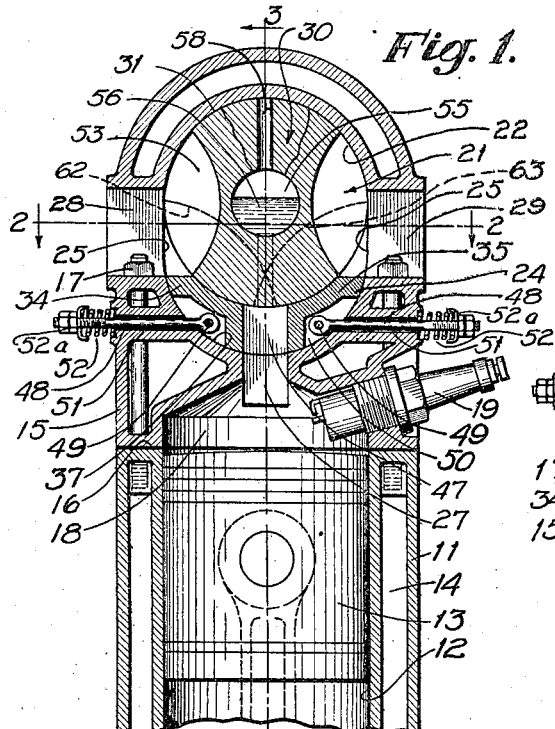
Fig. 1.
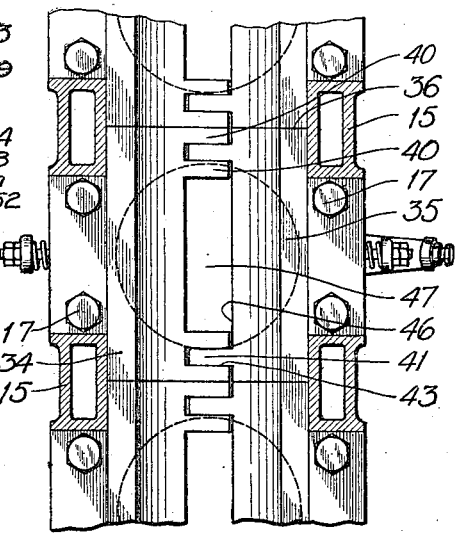
Fig. 2.
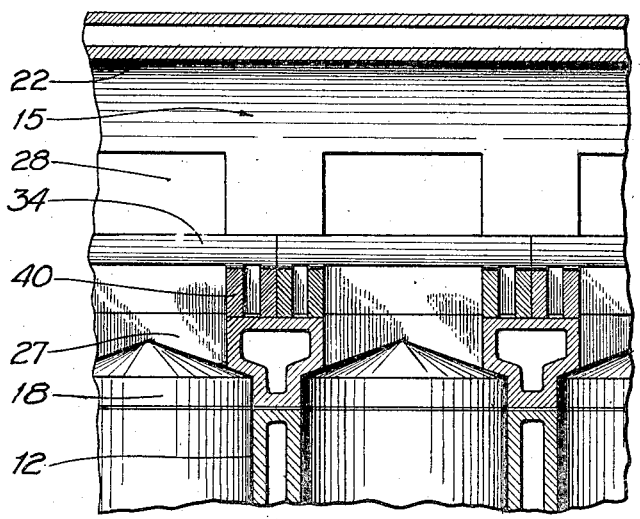
Fig. 3.
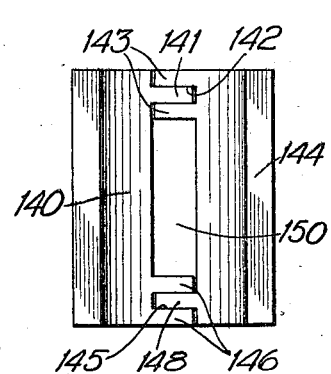
Fig. 8.
INVENTOR:  
JACOB SCHURCH,  
By  
ATTORNEY

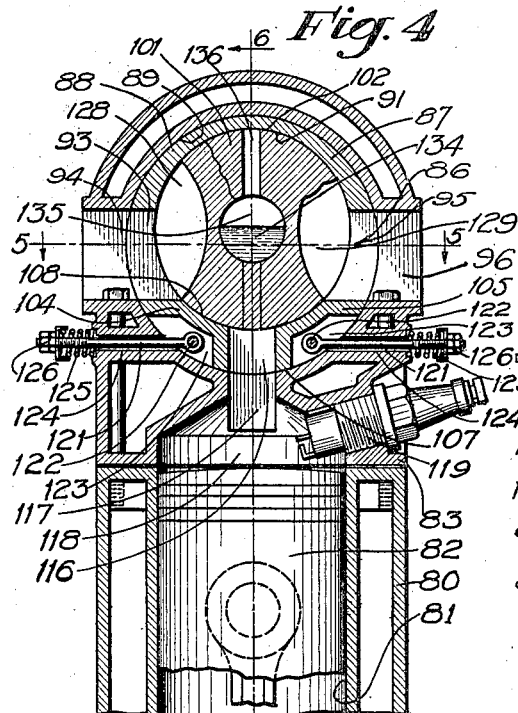

Patented Dec. 21, 1926.

1,611,683

UNITED STATES PATENT OFFICE.

JACOB SCHURCH, OF LOS ANGELES, CALIFORNIA.

ROTARY VALVE.

Application filed July 7, 1925. Serial No. 41,979.

My invention relates to a rotary valve which is adapted for use on internal combustion motors, compressors, etc. Internal combustion motors, compressors, etc., are usually provided with the tappet type of valve. Such a valve soon becomes inefficient because of carbon trouble, sticky valves, burned valves, faulty timing, lack of compression and for other reasons. Furthermore, all tappet valves are more or less noisy.

It is an object of my invention to provide a valve which will not have the ordinary tappet valve troubles.

It is also an object of my invention to provide a rotary valve for an internal combustion motor, or any place where valves are used for motive machinery.

It is another object of my invention to provide a valve of this character which will have but few parts.

It is an additional object of this invention to provide a rotary valve having a means for maintaining the rotary valve member properly seated.

It is a further object of my invention to provide a rotary valve in which pressure in the cylinder tends to properly seat the rotary valve member and to seal it against leakage.

Another object of this invention is to provide a noiseless valve.

Some internal combustion motors are provided with slide valves. Slide valves eliminate much of the tappet valve trouble such as aforementioned, but require many parts. One problem to contend with in a slide valve is expansion and contraction. Clearance must be left between the sliding members and when the motor is not at a maximum temperature there would be a leakage which lowers the efficiency of the motor.

It is another object of my invention to provide a rotary valve having a rotary valve member which will be tightly seated regardless of any expansion or contraction of the parts, and which will automatically compensate for any wear thereon.

It is also an object of my invention to provide a novel lubricating means for a rotary valve as mentioned above.

Other objects and advantages of this invention will be made evident hereinafter.

Referring to the two sheets of drawings in which I illustrate alternative forms of my invention:

Fig. 1 is a vertical cross section taken through one embodiment of my invention.

Fig. 2 is a section taken substantially on the line 2—2 of Fig. 1, the rotary valve member in this view being removed.

Fig. 3 is a vertical longitudinal section taken on the line 3—3 of Fig. 1, the rotary valve member in this view also being removed.

Fig. 4 is a vertical cross sectional view taken through an alternative form of my invention.

Fig. 5 is a section taken on the line 5—5 of Fig. 4, the rotary valve member being removed.

Fig. 6 is a sectional view taken on the line 6—6 of Fig. 4, a portion of the rotary valve member in this view being broken away.

Fig. 7 is a fragmentary perspective view showing an insert or journaling member which forms a part of the alternative form of my invention.

Fig. 8 is a plan view of an alternative form of wedge construction.

With reference to Figs. 1 to 3 inclusive of the drawings, a first form of my invention comprises a block 11 forming a plurality of cylinders 12 in which pistons 13 operate, and water chambers 14 which surround the cylinders 12. A cylinder head 15 is secured to an upper face 16 of the block 11 by bolts 17. The piston head 15 provides combustion chambers 18 which are situated at the upper ends of the cylinders 12, into which chambers 18 spark plugs 19 extend. Extending horizontally through the piston head 15 centrally above the cylinders 12 is an opening 21. As clearly shown in Fig. 1, the opening 21 is of oblong cross section having a semi-cylindrical seat or journaling face 22 and a lower semi-cylindrical face 24 which are connected together by opposite flat faces 25. Connecting between the opening 21 and the combustion chambers 18 are gas passages 27 and connecting with the opening 21 are intake openings 28 and exhaust openings 29, there being a pair of openings 28 and 29 for each cylinder 12. Extending through the opening 21 is a rotary valve member 30 which has a cylindrical face 31 which engages the seat or journaling face 22.

Placed in the opening 21 are pairs of wedge members 34 and 35. There is a pair of wedge members 34 and 35 for each cylinder 12, as clearly shown in Figs. 2 and 3, these pairs of wedge members having abutting faces 36. The wedge members 34 and 35 have outer semi-cylindrical faces 37 which engage the lower semicylindrical face 24 of the piston head 15 and have inner semi-cylindrical seat faces 38 which engage the outer cylindrical face 31 of the rotary valve member 30. As clearly shown in Fig. 1, the faces 37 and 38 of the wedge members 34 and 35 converge at the outer parts thereof and are truly wedge-shape.

With reference to Figs. 2 and 3, the wedge members 34 have pairs of tenons 40 formed at each end thereof and the wedge members 35 have tenons 41 formed near each end thereof which extend into mortises 43 formed between the tenons 40 of the wedge members 34. Adjacent walls 46 of the wedge members 34 and 35 are spaced apart, as clearly shown in Figs. 1 and 2, so as to provide spaces 47 which communicate between the passages 27 and the rotary valve member 30. I-bolts 48 pivot on pins 49 carried in cavities 50 of the wedges 34 and 35 and extend to the exterior of the head 15 through openings 51. Compression springs 52 surrounding the I-bolts 48 exert an outward resilient force against the I-bolts 48 through a cap and nuts 52ᵃ secured on each of the I-bolts. This arrangement exerts an outward pull on the wedge members 34 and 35 and holds them resiliently but tightly against the rotary valve member 30 so as to keep it in proper seated position against the seats 22 and 38.

Gas channels 53 are formed in the rotary valve member 30 in positions to communicate with the intake and exhaust openings 28 and 29 and with the spaces 47. A cylindrical chamber 55 is formed concentrically inside the rotary valve member 30, in which a body of lubricating oil 56 is placed. Radial openings 58 communicate between the oil chamber 55 and the exterior of the rotary valve member 30 through which the lubricating oil may pass to lubricate the frictional engaging surfaces of the valve construction.

The operation of the motor just described is as follows:

The rotary valve member 30 is rotated by mechanism not shown in the drawings. During the intake stroke of the piston 13 shown in Fig. 1, the rotary valve 30 is moved into a position so that one of the gas channels 53 as indicated by the broken lines 62 communicates between the intake openings 28 and the space 47. The piston 13 moves down and gas is drawn into the combustion chamber 18 and the upper end of this cylinder 12. The rotary valve member 30 then moves into the position shown in Fig. 1 and the piston 13 moves upward in the cylinder 12, compressing the gas therein. The compressed gas is then exploded in the combustion chamber 18 by a spark produced by the spark plug 19, this forcing the piston 13 downward in the cylinder 12. The rotary valve member 30 then moves into such a position that the right hand gas channel 53 moves into the position indicated by dotted lines 63 of Fig. 1 so as to communicate between the exhaust opening 29 and the space 47. When the piston 13 moves upward in the cylinder 12, the expended gas is forced therefrom. As the rotary valve member 30 rotates, oil will flow through the radial opening 58 to the cylindrical face 31 thereof, thus supplying adequate lubrication.

A tight seating of the rotary valve member 30 is maintained by the cooperating wedge members 34 and 35 of each of the cylinders 12. Each pair of wedge members operates independently of the other. The wedge members 34 and 35 are ordinarily retained resiliently in position to properly seat the rotary valve member 30 by the compression springs 52, which act through the I-bolts 48. They are also positioned so that pressure in the cylinders 12 will assist in maintaining the rotary valve member 30 tightly seated. When a pressure in the cylinder 12 is shown in Fig. 1 increases, a force is exerted against the adjacent walls 46 which form the space 47, this tending to wedge the members 34 and 35 between the cylindrical face 31 of the rotary valve member 30 and the semi-cylindrical seat 24 of the cylinder head 15. The higher the pressure in the cylinder 12, the greater will be the force which tends to seat the rotary valve member 30. During the explosion in the combustion chamber 18, the wedge members 34 and 35 will be forced outwardly at an enormous pressure and the rotary valve member 30 will be forced against the seats 22 and 38 with a very high pressure which will assure that no leakage will occur. The tenons 40 of the wedge members 34 are forced outwardly when a high pressure occurs in the combustion chambers 18 which seals between the separate cylinders 12. By making the wedge members 34 and 35 independent between the various cylinders 12 their operation will be independent and will individually seal each separate cylinder 12.

In Figs. 4 to 7, inclusive, I show another form of my invention. With reference to these figures I provide a block 80 having a series of cylinders 81 in which pistons 82 operate. A cylinder head 83 is secured to the upper end of the block 80 by bolts 84. A cylindrical opening 86 is formed in the piston head 83. This opening 86 extends horizontally and centrally above the row of cylinders 81. Placed in the cylindrical opening 86 is an insert or journaling member 87 having a semi-cylindrical face 88 which engages a cylindrical face 89 of the opening 86. The insert or journaling member 87 is formed as clearly shown in Figs. 4 and 7. A semi-cylindrical seat or journaling face 91 is formed inside the journaling member 87 eccentrically with respect to the outer semi-cylindrical face 88. The journaling member 87 is cut away to provide intake openings 93 which communicate with intake passages 94 of the cylinder head 83 and exhaust openings 95 which communicate with passages 96 of the cylinder head 83. Centrally between the pairs of openings 93 and 95 are ring portions 98 having horizontal shoulders 99 formed at each side thereof between themselves and the openings 93 and 95. A rotary valve member 101 is placed inside the journaling member 87 so that an outer cylindrical face 102 thereof engages the semi-cylindrical seat or journaling face 91.

Pairs of wedge members 104 and 105 have outer semi-cylindrical faces 107 which engage the cylindrical face 89 of the opening 86 and have semi-cylindrical seats or journaling faces 108 which are arranged to engage the cylindrical face 102 of the rotary valve member 101. These pairs of wedge members 104 and 105 are placed between the ring portions 98 of the journaling member 87. As clearly shown in Fig. 4, the faces 107 and 108 of the wedge members 104 and 105 converge at their outer parts and the wedge members are therefore wedge-shape. The wedge members 104 have tenons 110 formed near each end thereof and the wedge members 105 have tenons 111 formed near each end thereof which extend into mortises 112 provided between the tenons 110 of the wedge members 104. Adjacent faces 114 of the wedge members 104 and 105 are spaced apart, as clearly shown in Figs. 4 and 5, so as to provide a space 116 which connects between the interior of the journaling member 87 and a passage 117 which communicates with a combustion chamber 118 formed in the cylinder head 83 at the upper end of each of the cylinders 81. I-bolts 121 pivot on pins 122 carried in cavities 123 of the wedges 104 and 105 and extend to the exterior of the head 83 through openings 124. Compression springs 125 surrounding the I-bolts 121 exert an outward resilient force against the I-bolts 121 through a cap and nuts 126, secured on each of the I-bolts. This arrangement exerts an outward pull on the wedge members 104 and 105, causing them to engage the faces 89 and 102, thus tightly seating the rotary valve member 101.

The rotary valve member 101 has an axial concentric oil chamber 134 which is adapted to contain a body of oil 135. Extending from the oil chamber 134 to the cylindrical face 102 of the rotary valve member 101 are radial oil openings 136 which supply oil to the frictionally engaging faces of the valve construction as the rotary valve member 101 rotates. The rotary valve member 101 has intake gas channels 128 and exhaust gas channels 129 which are positioned to communicate between the intake opening 93 and the space 116 and the exhaust opening 95 and the space 116, respectively.

The operation of this modification of my invention is substantially the same as the first described form of my invention. Pairs of wedge members 104 and 105 are provided for each of the cylinders 81 and are positioned between the ring portions 98 of the journaling member 87. They are pulled outwardly by the compression springs 125, tending to tightly seat the rotary valve member 101. When a pressure is present in any of the combustion chambers 118, having spark plugs 119, the wedge members 104 and 105 are forced outwardly by this pressure and cause the rotary valve member 104 to be maintained tightly in seating contact with the semi-cylindrical seats 91 and 108.

The second modification of my invention does not require the formation of an opening of oblong cross section in the piston head. It does, however, require a separate part in the form of a journaling member 87. The wedges 104 and 105 may be formed from the parts cut out of the journaling member 87.

In Fig. 8 I show another form of wedge construction. In this figure a wedge 140 has a single tenon 141 at one end which extends into a mortise 142 formed between a pair of tenons 143 of a wedge 144. The other end of the wedge 140 has a mortise 145 formed between a pair of tenons 146 into which a single tenon 148 of the wedge 144 extends. One end of a central space 150 between the wedges 140 and 144 is closed by one of the tenons 143 of the wedge 144 and is closed at the other end by one of the tenons 146 of the wedge 140. This tenon and mortise arrangement results in a tendency for a pressure in the space 150 to move the wedges 140 and 144 in opposing axial directions which effectively seals the ends of the wedges by causing a pressurable contact between the adjacent tenons.

From the foregoing description it is obvious that the valve of my invention is in the first place very simple in construction, requiring but few parts which are rugged and easily machined. A rotary valve of this character does not have any carbon troubles due to the fact that the rotary valve member is rotating at all times and carbon cannot collect thereon. There will be no timing trouble due to the fact that the rotary valve member is integral and there are no parts to get out of proper timing order. Further, it is possible to provide large gas passages which are desirable. My invention provides a means as described for keeping the rotary valve member tightly seated at all times. Therefore, the efficiency of the motor will be maintained regardless of any wear on the moving parts. The rotary valve member of my invention is thoroughly lubricated by the means set forth in the description and shown in the drawings. Any inefficiency due to expansion or contraction is entirely eliminated in my invention. The wedge members are so arranged that they at all times retain the rotary valve member tightly seated. These wedge members are moved outwardly or inwardly to maintain a tight seat and therefore as the parts expand or contract, these wedge members will move correspondingly, but always maintain a tight seat and prevent leakage.

I claim as my invention:

1. In combination: walls forming a cylinder; walls forming an opening having a seat; a rotary valve member situated in said opening; and opposed means operable in opposite directions for pressurably holding said rotary valve member against said seat, said means being permanently exposed to pressure in said cylinder and operable thereby to increase their holding pressure against said valve coincident with an increase in said cylinder pressure.

2. In combination: walls forming a cylinder; walls forming an opening having a seat; a rotary valve member situated in said opening; and opposed means situated between said rotary valve member and said cylinder and operable in opposite directions for pressurably holding said rotary valve member against said seat, said means being permanently exposed to pressure in said cylinder and operable thereby to increase their holding pressure against said valve coincident with an increase in said cylinder pressure.

3. In combination: walls forming a cylinder; walls forming an opening having a seat; a rotary valve member situated in said opening; and opposed wedge members for pressurably holding said rotary valve member against said seat, said wedge members being permanently exposed to pressure in said cylinder and operable thereby to increase their holding pressure against said valve coincident with an increase in said cylinder pressure.

4. In combination: walls forming a cylinder; walls forming an opening having a seat; a rotary valve member situated in said opening; and opposed wedge members situated between said rotary valve member and said cylinder for pressurably holding said rotary valve member against said seat, said wedge members being permanently exposed to pressure in said cylinder and operable thereby to increase their holding pressure against said valve coincident with an increase in said cylinder pressure.

5. In combination: walls forming a cylinder; a piston operable in said cylinder; walls forming an opening having a seat, there being a passage connecting said opening with said cylinder; a rotary valve member situated in said opening; and opposed means operable in opposite directions for forcing said rotary valve member tightly against said seat when said piston operates and produces a pressure in said cylinder, said means being permanently exposed to pressure in said passage and operable thereby to increase their holding pressure against said valve coincident with an increase of pressure in said cylinder and passage.

6. In combination: walls forming a cylinder; walls forming an opening having a seat, there being a passage connecting said opening with said cylinder; a rotary valve member situated in said opening; and opposed means operable in opposite directions for forcing said rotary valve member tightly against said seat when a pressure occurs in said cylinder, said means being permanently exposed to pressure in said passage and operable thereby to increase their holding pressure against said valve coincident with an increase of pressure in said cylinder and passage.

7. In combination: walls forming a cylinder; walls forming an opening having a seat, there being a passage connecting said opening and said cylinder; a rotary valve member in said opening; opposed wedges placed in said opening between said rotary valve member and said cylinder; and means for spreading said wedges apart to resiliently impart a predetermined force to said rotary valve member to urge it against said seat, said wedges being permanently exposed to pressure in said passage and operable thereby to increase their holding pressure against said valve coincident with an increase of pressure in said cylinder and passage.

8. In combination: walls forming a cylinder; walls forming an opening having a seat, there being a passage connecting said opening and said cylinder; a rotary valve member in said opening; opposed wedges placed in said opening between said rotary valve member and said cylinder; and a spring acting on said wedges for spreading said wedges apart to resiliently impart a predetermined force to said rotary valve member to urge it against said seat, said wedges being permanently exposed to pressure in said passage and operable thereby to increase their holding pressure against said valve coincident with an increase of pressure in said cylinder and passage.

9. In combination: walls forming a cylinder; walls forming an opening having a semi-cylindrical seat, there being a passage connecting said opening and said cylinder;

a rotary valve member arranged in said opening; and a pair of cooperating wedges situated in said opening between said rotary valve member and said passage, said wedges having spaced adjacent faces, said wedges being so arranged as to be moved outwardly by a pressure in said cylinder acting against said spaced faces, in a manner to force said rotary valve member tightly against said seat.

10. In combination: walls forming a cylinder; walls forming an opening having a seat; a rotary valve member situated in said opening, there being lubricating means inside said rotary valve member for lubricating said seat and the external face of said rotary valve member; and opposed means operable in opposite directions for pressurably holding said rotary valve member against said seat, said means being permanently exposed to pressure in said cylinder and operable thereby to increase their holding pressure against said valve coincident with an increase in said cylinder pressure.

11. In combination: walls forming a cylinder; walls forming an opening having a seat; a rotary valve member situated in said opening, there being lubricating means inside said rotary valve member for lubricating said seat and the external face of said rotary valve member; and opposed means situated between said rotary valve member and said cylinder and operable in opposite directions for pressurably holding said rotary valve member against said seat, said means being permanently exposed to pressure in said cylinder and operable thereby to increase their holding pressure against said valve coincident with an increase in said cylinder pressure.

12. In combination: walls forming a cylinder; walls forming an opening having a seat; a rotary valve member situated in said opening, there being lubricating means inside said rotary valve member for lubricating said seat and the external face of said rotary valve member; and opposed wedge members operable in opposite directions for pressurably holding said rotary valve member against said seat, said wedge members being permanently exposed to pressure in said cylinder and operable thereby to increase their holding pressure against said valve coincident with an increase in said cylinder pressure.

13. In combination: walls forming a cylinder; walls forming an opening having a seat; a rotary valve member situated in said opening, there being lubricating means inside said rotary valve member for lubricating said seat and the external face of said rotary valve member; and opposed wedge members situated between said rotary valve member and said cylinder and operable in opposite directions for pressurably holding said rotary valve member against said seat, said wedge members being permanently exposed to pressure in said cylinder and operable thereby to increase their holding pressure against said valve coincident with an increase in said cylinder pressure.

In testimony whereof. I have hereunto set my hand at Los Angeles, California, this 2nd day of July, 1925.

JACOB SCHURCH.